Oct. 17, 1967 W. S. CONLON 3,347,369
REVOLVING TABLE CAPABLE OF BEING DISMANTLED
Filed Aug. 17, 1965 2 Sheets-Sheet 1
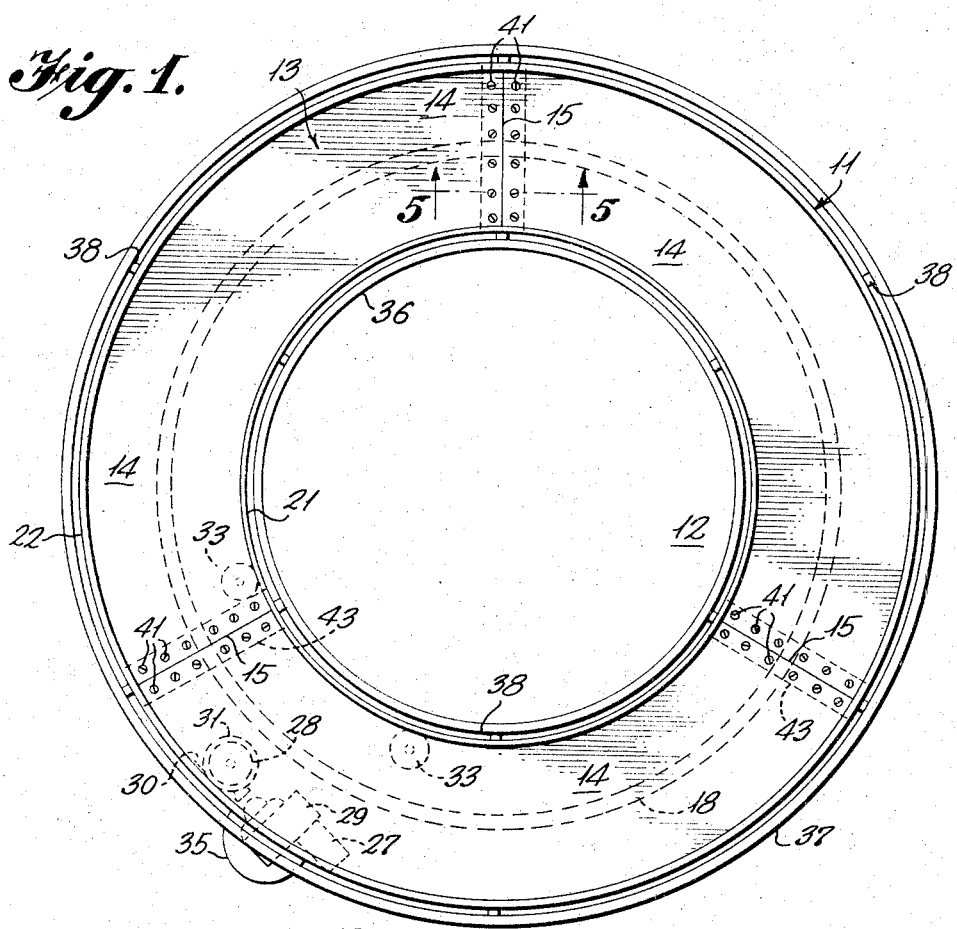
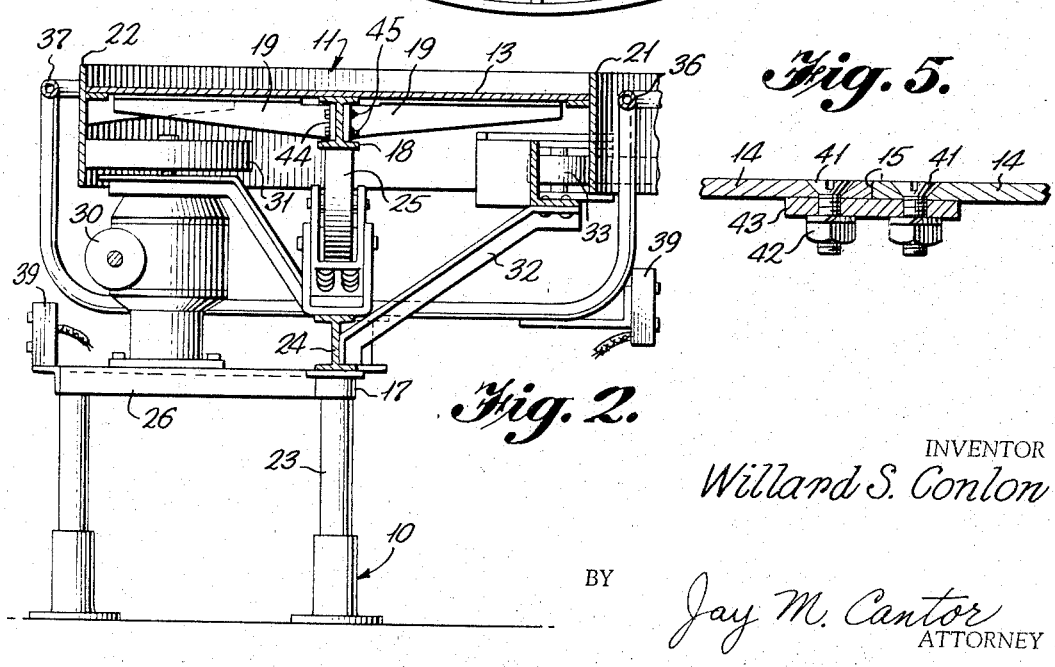
INVENTOR
Willard S. Conlon
BY
Jay M. Cantor
ATTORNEY Oct. 17, 1967   W. S. CONLON   3,347,369
REVOLVING TABLE CAPABLE OF BEING DISMANTLED
Filed Aug. 17, 1965   2 Sheets-Sheet 2

INVENTOR
Willard S. Conlon
BY
Jay M. Cantor
ATTORNEY

United States Patent Office 3,347,369
Patented Oct. 17, 1967

3,347,369
REVOLVING TABLE CAPABLE OF BEING DISMANTLED
Willard S. Conlon, 6129 Leesburg Pike,
Falls Church, Va. 22041
Filed Aug. 17, 1965, Ser. No. 480,281
6 Claims. (Cl. 209—124)

ABSTRACT OF THE DISCLOSURE

A sorting table comprising an annular surface rotatably supported on a base by a monorail. The table and monorail are made of a plurality of segments to allow quick dismantling and assembly for moving from one location to another. A pair of guard rails protect personnel from contact with the inner and outer edges of the table and a plurailty of switches are arranged for controlling the starting and stopping of the table.

The present invention relates to revolving tables from which parcels may be sorted for forwarding to a plurality of designated destinations. More particularly, the present invention relates to a revolving table fixed to a monorail for rotation on a plurality of resilient rollers and having a selective variable speed drive and capable of being dismantled, whereby the rotative speed of the table may be adjusted to coincide with the working speed of the personnel performing the sorting operation; that is, the speed at which the parcels may be conveniently lifted from the table and deposited in selected bins or other such devices.

The drive mechanism and the rotating table are provided with safety guards to prevent injury to the personnel using the table. A frictional drive is provided between the motor and the table, thereby obviating the noise usually associated with the prior art driving systems employing gears. Another advantage of the frictional drive is that in case of emergency, the rotating table may be forcibly stopped by the personnel at hand, without shutting off the motor, by holding the table, thus causing the friction drive to slip. It is, of course, understood that a plurality of switches are provided in order to conveniently turn on or off the current to the motor.

An object of the present invention, therefore, is to provide a revolving table for package sorting which is provided with a driving apparatus and capable of being dismantled whereby the speed of rotation is readily controlled.

Another object is to provide a revolving table having a simple friction drive connection between the driving apparatus and the table and which is substantially positive in operation.

Still another object is to provide a revolving table, wherein the table is yieldably supported for rotation on the base structure, thus compensating for slight unevenness between the supporting structure and the monorail.

A further object is to provide apparatus for use in sorting parcels, wherein the large diameter table is fabricated in a plurality of sections and capable of being dismantled for convenient transportation.

A still further object is to provide a sorting table, wherein the table and drive means are substantially noiseless in operation.

An additional object is to provide a revolving sorting table which comprises features whereby the table is rendered safe to the operating personnel.

Other objects and many of the attendant advantages of this invention will be readily appreciated as the same becomes better understood by reference to the following detailed description when considered in connection with the accompanying drawings, wherein:

FIGURE 1 is a top plan view of the table and apparatus of the present invention;

FIGURE 2 is a vertical sectional view through the table, the supporting structure therefor, and showing the driving mechanism;

FIGURE 5 is a sectional view taken along the line 5—5 of FIGURE 1.

Figure 3:
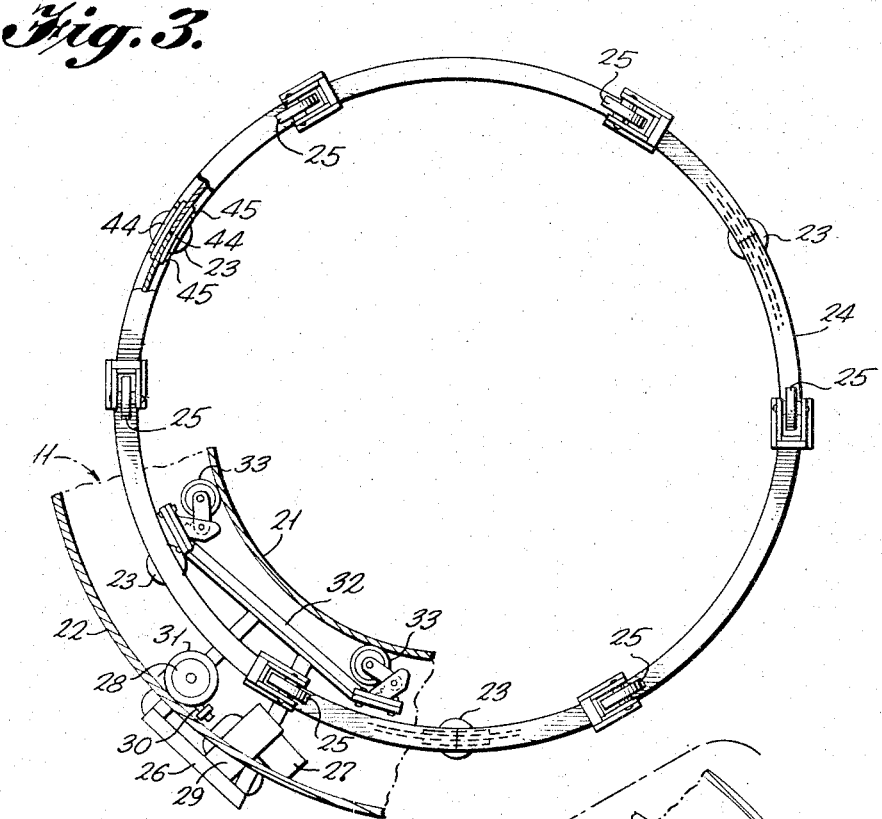
FIGURE 3 is a plan view partially in section showing the relative positions of the driving roller and the tension rollers therefor and the table supporting rollers.

Referring more particularly to the drawings, wherein like numerals indicate like parts throughout the several views, 10 indicates, generally, the supporting structure, while 11 indicates, generally, the rotating table. Table 11 is toroidal in form having a circular opening 12 in the center thereof. A substantially flat deck portion 13 of the table 11 is formed of a plurality of arcuately shaped plates 14 joined at the overlapped radial edges 15 thereof by bolts or rivets 16 to complete the circular table 11. However, at three junctions of the arcuate plates 14 at positions of 120° apart, the rivets are replaced by a plurality of cap screws 41 and bolts 42, the cap screws being counter-sunk into the plates 14. These screws are anchored in a splice bar 43 bridging alternate pairs of plates 14. The cap screws and splice bars are utilized to allow the deck to be dismantled. The cap screws and splice bars are also positioned on the guard flanges 21 and 22.

The deck portion 13 is fixed to a frame 17 which comprises an I-beam of circular configuration forming a monorail 18 and radially arranged ribs 19 secured to the monorail 18. The monorail 18 is formed of three 120° sections which are held in position by cap screws 45 which are anchored in the splice bars 44 (FIGURE 5). Fixed to the deck portion 13 and extending vertically above and below the deck at the inner and outer peripheries thereof are the circular guard flanges 21 and 22, respectively, to prevent parcels from falling from the deck 13 and for an additional purpose, to be more fully described hereinafter.

The structure 10 for supporting the foregoing table 11 comprises a plurality of spaced circularly arranged vertical supporting legs 23 having mounted on the top thereof a circular I-beam 24. A plurality of spaced spring-biased rollers 25 are mounted on the upper surface of I-beam 24 and engage the monorail 18, thus supporting the table 11 for rotation. The rollers 25 are provided with conventional resilient tires, thus to reduce the noise of operation.

An auxiliary supporting frame 26 is positioned exteriorly of frame 17 and fixed thereto. Frame 26 has mounted thereon a source of motive power 27 such, for example, as an electric motor, which drives a driving wheel 28 through a variable-ratio drive indicated at 29, and a fixed-ratio reduction gear 30. Wheel 28 is provided with a suitable hard rubber tire 31 which, preferably, frictionally engages the inner wall of the lower extension of outer guard flange 22, thus providing means for rotating table 11 at a desired speed.

Additional frame structure 32 is provided on the inner side of frame 17 opposite frame 26 to support a pair of spring-biased rollers 33 spaced on opposite sides of a radial centerline passing through wheel 28 and the axis of table 11. Rollers 33 engage the inner surface of the lower extension of guard flange 21 to ensure frictional engagement of wheel 28 with flange 22 and to align the table with the rollers 25.

Figure 4:
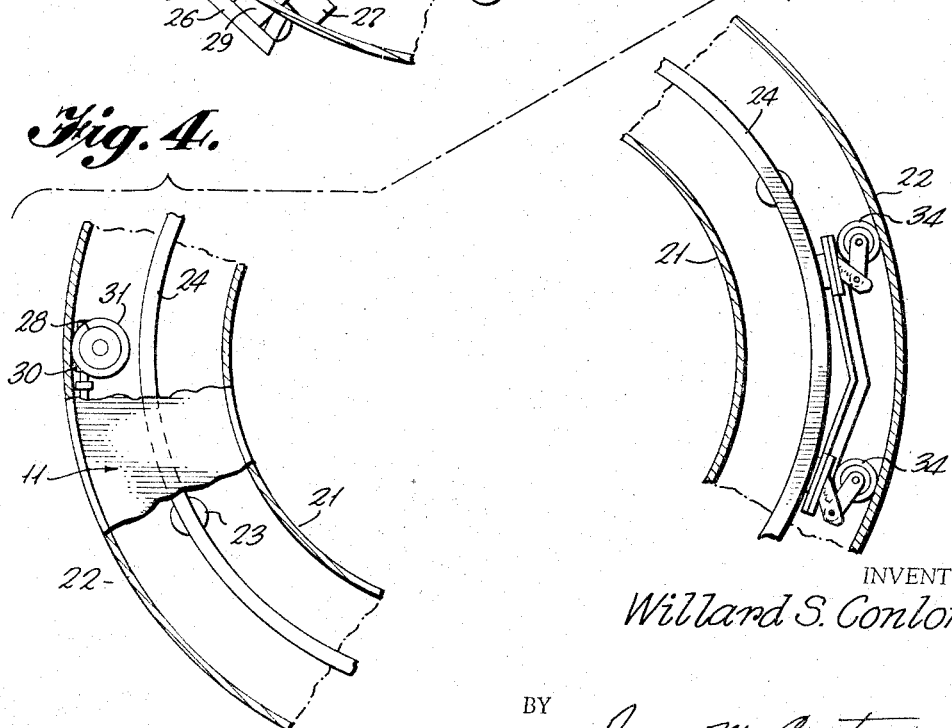
FIGURE 4 is a sectional view showing the relative positions of the driving roller and the tension rollers in a modified form of the invention.

If desired, as shown in the modification of FIGURE 4, spring-biased rollers 34 may replace the rollers 33. The rollers 34 are mounted to engage the inner surface of flange 22 and are spaced on either side of a point diametrically opposite to drive wheel 28. While both forms of rollers 33 and 34 perform substantially the same function, rollers 34 may serve to more effectively maintain track or monorail 18 of the table in alignment with rollers 25.

If desired, the drive mechanism may be provided with a guard casing 35 to prevent injury to personnel. In the interest of safety there are also provided inner and outer guard rails 36 and 37, respectively, slightly spaced from the rotating table 11 and mounted on spaced U-shaped supports 38 which are fixed to an I-beam 24. The guard rails 36 and 37 prevent accidental contact of personnel with the rotating table 11.

A plurality of push-button switches 39 are conveniently mounted on frame 17 for shutting off and turning on a source of electrical power to the motor 27.

In operation, parcels are fed on to the table 11 from a conveyor belt or other means (not shown), the parcels being picked by an operator or operators standing in the opening 12, or, if more convenient, the operators may stand both inside and outside the table 11. The parcels may be taken from the rotating table and placed by the operator in an appropriate chute or bin to be forwarded to the destination indicated on the parcel.

Although the invention has been described with respect to preferred specifiic embodiments thereof, it should be understood that many variations and modifications thereof will immediately become apparent to those skilled in the art. It is therefore the intention that the appended claims be interpreted as broadly as possible to include all such variations and modifications.

What is claimed is:

1. A sorting table comprising a horizontal annular planar support, a rail secured to the undersurface of said support, an annular flange extending above and below said support secured to each of the inner and outer circumferences of said support, means engaging said rail to support the table for rotation about a given axis, and roller means engaging at least one of said flanges for guiding and rotating the table about said axis.

2. A device as defined in claim 1 wherein the roller means comprises a driving roller engaging the radially inner surface of the outer flange and at least a pair of rollers spaced on opposite sides of a radial center line through said driving roller engaging the radially outer surface of the inner flange, and spring means biasing said pair of rollers into engagement with the inner flange.

3. A device as defined in claim 1 wherein the roller means comprises a driving roller engaging the radially inner surface of the outer flange and at least a pair of rollers spaced on opposite sides of a diametrical line through said driving roller engaging the radially inner surface of the outer flange, and spring means biasing said pair of rollers into engagement with the outer flange.

4. A device as defined in claim 1 further including a motor to drive one of said rollers and a plurality of switches for controlling the motor.

5. Apparatus for use in sorting objects comprising a circular supporting structure, a plurality of spaced spring-biased rollers mounted on said supporting structure, a circular monorail including plural sections capable of being dismantled mounted for rolling motion on said rollers, a ring-shaped table including plural sections capable of being dismantled fixed to and superposed on said monorail, inner and outer circumferential flange members, each flange member including plural sections capable of being dismantled, fixed respectively to the inner and outer peripheries of said table and extending vertically above and below said table, a drive wheel having means for frictionally engaging one of said flange members, variable ratio drive means operatively connected to said driving wheel for rotating said table at a plurality of selected speeds, and guard rails fixed to said supporting structure and in adjacency to the peripheries of said table.

6. Apparatus for use in sorting parcels comprising an electric motor, a variable ratio driving means operatively connected to said motor, a reduction gear operatively connected to said variable ratio driving means, a driving wheel driven by said reduction gear, a substantially circular supporting structure, a plurality of spaced rollers mounted in circular formation on said supporting structure, a circular table having a central circular opening therein, inner and outer flanges, each of said flanges including plural sections capable of being dismantled and fixed vertically on the inner and outer peripheries of said table and extending above and below said table, a circular rail including plural sections capable of being dismantled fixed to the underside of said table midway of said inner and outer peripheries, said driving wheel frictionally engaging one of said flanges whereby the table may be rotated at a desired speed, and a pair of spring-biased rollers engaging the other of said flanges to ensure frictional engagement of said driving wheel.

References Cited

UNITED STATES PATENTS

| | | | |
|---|---|---|---|
| 1,184,528 | 5/1916 | Henderson | 209—124 |
| 1,877,479 | 9/1932 | Lindley | 209—124 |
| 2,842,265 | 7/1958 | Bozeman et al. | 209—124 |
| 3,180,483 | 4/1965 | Johnston et al. | 209—124 X |

FOREIGN PATENTS 592,230  9/1947  Great Britain.

ALLEN N. KNOWLES, *Primary Examiner.*